2,932,128
SEED IMPREGNATION INCLUDING BACTERIAL AND VACUUM TREATMENT

Frederic E. Porter and Vernon W. McAlpine, Columbus, Ohio, and Howard E. Kaerwer, Jr., Hopkins, Minn., assignors, by direct and mesne assignments, to Northrup, King & Co., Minneapolis, Minn., a corporation of Minnesota No Drawing. Application October 14, 1957
Serial No. 689,755

19 Claims. (Cl. 47—58)

This invention relates to the impregnation of seeds with finely divided solid particulate matter. More particularly, this invention relates to the inoculation of seeds, under conditions of reduced pressure, with particulate matter, for example, viable microorganisms.

A long-standing objective of agricultural technologists has been the inoculation of seeds for such purposes as improving the viability of the seeds or improving the plants growing from the seeds. In pursuance of this, various materials have been incorporated with seeds. For example, nitrogen-fixing bacteria have been incorporated with seeds of legumes in order that the resulting plants may be less dependent upon soil nitrates for growth. There are many variations in the technique of incorporating the bacteria with the seeds, but essentially these techniques consist of intimately mixing the seeds with the bacteria-laden fluid or dust to form a coating over the surface of the seeds. Ordinarily, when dusts are employed, the seeds must be moistened before the inoculum will adhere. Thus, the present practice results in the bacteria being held in a coating on the shell or hull of the seed.

A principal disadvantage of the present practice is that the seeds must be planted immediately after treatment if best results are to be obtained. If the seeds are not planted within 24 hours, it is generally recommended that the seeds be re-inoculated because the bacteria usually will have died within this time limit. The seed must then be treated again. Thus, the treated seeds, in accordance with the present practice, do not retain the benefit of such treatment upon storage. The farmer must closely coordinate the time of treatment with the planting time. Since the planting time is dependent upon an uncontrollable and, oftentimes, unpredictable factor of weather, it may not be possible to plant the treated seeds within the prescribed time after treatment. In such instances, the treatment results in a waste of time and money for the farmer.

Furthermore, since the bacteria exist in the form of a layer on the outer surface of the seeds, the bacteria and the coating are susceptible to adverse environmental conditions whereby the bacteria does not survive sufficiently long to infect the seedling roots. Also, the coating may be scraped or rubbed off from the seed when mechanical planting equipment is used.

The purpose of this invention is to provide a method for the introduction of bacteria, for example, into or beneath the seed coat of seeds. In the case of legumes, the process permits nitrogen-fixing bacteria to be introduced beneath the surface of the seeds where the bacteria are protected from drying and other adverse environmental conditions. It has been found that bacteria so introduced persist longer than bacteria placed on the seed coat of seeds in accordance with present practices. By this invention, it is possible to produce bacteria-inoculated seeds which can be stored for a reasonable length of time before planting. Surprisingly, the bacteria have been observed to persist in the inoculated seeds for several months, even when stored under ordinary room temperatures. The inoculation process can be made a part of the usual process of screening and cleaning of the seeds on the part of the seed supplier. Inoculated, storageable seeds relieve the farmer of the time-consuming and sometimes fruitless operation of treating the seeds immediately prior to planting time.

In accordance with this invention, the seeds are subjected to reduced pressure while in contact with a liquid suspension of suitable bacteria, Rhizobium spp., for example. The resultant partial vacuum is released and the seeds are then dried in any suitable manner. It is an essential feature of this invention that the seeds be in contact with a liquid suspension or dispersion of the bacteria while the pressure is being reduced. This may be accomplished by immersing the seeds in the liquid suspension of the bacteria and subjecting the mixture of the seeds and the liquid bacterial suspension to reduced pressure. Alternatively, the bacterial suspension may be applied to the seeds by dipping or spraying so that the seeds are coated with the bacterial suspension over all, or substantially all, of the surface of the seed. The seeds are subjected to treatment under reduced pressure. Since immersion of the seeds may contaminate the slurry and limit the reuse of the slurry, the spray application is ordinarily favored in view of the cost of preparing bacterial suspensions. In addition, the spray-coated seeds retain less of the suspending liquid of the slurry than than do the seeds which have been immersed in the slurry during the reduced pressure treatment and therefore can be more easily dried after inoculation.

It is an object of this invention to obtain inoculation of the seeds, without soaking of the seeds and resultant swelling whereby the protective seed coat or hull is deleteriously ruptured or destroyed. In accordance with this invention, prolonged immersion of the seeds in a bacterial slurry is obviated. In the inoculation or impregnation step of this process, the pressure is reduced and then either immediately released or released within a relatively short period of time which is insufficient to cause the seeds to be saturated to the extent that they are in a bloated or swelled condition and the protective seed coat thereby destroyed. This relatively short period of time also is insufficient to initiate the germination process which would cause the seeds to die if they were not planted immediately. Thus, it is possible to obtain inoculated, storageable seeds which are intact against attack by deleterious environmental influences, and, in the case of viable microorganisms, have the microorganism protectively retained beneath the surface of the seed.

The extent to which the pressure is reduced in the inoculation step of this process may vary considerably. Effective inoculation of seeds having loose seed coats, such as those of the type represented by lima beans or peas, begins to occur soon after the reduction in pressure is begun and the pressure begins to drop. Lower pressures may be desirable in the inoculation of seeds having adherent, hard seed coats, such as those of the type represented by alfalfa or clover seeds, although the use of lower pressures may be avoided by suitably processing such seeds before the inoculation step. For example, the processing may be by scarification which, as is well known in the art, consists of superficially scarring the seed coats of the seeds. The lowest pressure to which the seeds may be exposed is generally limited by the vapor pressure of the liquid medium in which the bacteria or other finely divided particulate matter is suspended. Ordinarily, water is a suitable liquid medium and, in the case of inoculating seeds in contact with an aqueous bacterial slurry, treatment under a reduced pressure of about 1.1 inches of mercury provides rapid inoculation of seeds with the bacteria. In any event, it is possible to subject the seeds to the reduced pressure and release the vacuum thus created within a very short time, thereby avoiding soaking the seeds which would cause the protective seed coat or hull to be deleteriously ruptured. The term "vacuum" is used herein to describe the state of reduced pressure existing on the seeds or mixture of seeds and slurry.

There is no apparent advantage gained by repeated reduced pressure treatments. It is only necessary that the seeds in contact with the bacterial slurry be maintained at a reduced pressure for a relatively short period of time, so that the seeds do not become damaged, as described. It is believed that the vacuum loosens the seed coat slightly so that when the pressure on the seeds is reduced, the bacteria may enter the seed coat. When the vacuum is released, the bacteria then are forced into or under the seed coat. Although the pressure may be reduced gradually, the vacuum preferably should be released rather rapidly whereby the increase in pressure upon return to atmospheric pressure forces the bacteria or other particulate matter beneath the surface of the seed.

The bacterial slurries for use in accordance with this invention may be made according to conventional and well-known methods. The desired bacteria may be grown on a suitable growth medium, isolated from the growth medium, and then simply dispersed or suspended in a suitable liquid medium, for example, water. However, contributory to this invention are the discoveries, as hereinafter described, that certain modifications of the bacterial slurry are beneficial. Thus, the presence of certain materials in the bacterial slurry appear to have a protective effect on the bacteria in the seed. These materials are the extraneous materials, such as bacterial gum and metabolic products produced in the bacterial culture. These metabolic products and the bacterial gum may be added to the slurry, along with the bacteria. In addition, the presence of surface-tension depressants, i.e., surfactants, in the bacterial slurry are beneficial, in that they promote impregnation and appear to stimulate the growth of the bacteria after the seeds have been planted. The reduction of the surface tension of the bacterial slurry, due to the presence of surface-tension depressants, promotes the wetting of the seeds and aids the penetration of the bacteria into the seeds. Any of the surface-tension depressants which are nontoxic to the bacteria may be used; for example, suitable surface-tension depressants are the polyoxyalkylene derivatives of hexitol anhydride partial long-chain fatty acid esters. It is to be understood, of course, that the bacterial slurry may contain other components. For example, the slurry may contain various factors that promote bacterial survival or growth, or promote plant growth.

The following examples are given as specific illustrations of the invention, and are not be interpreted as limiting thereof, other than as set forth in the claims.

*Example A.—Preparation of the bacterial slurry.—* Bacteria of the genus Rhizobium were grown on yeast mannitol agar. The rhizobia were harvested by washing the growth off if the agar with water to carry with the bacteria the extraneous materials, such as bacterial gum and metabolic products, produced during the growth. Water was then added to the washings to make up a slurry of desired concentration. The concentration of the bacteria in the slurry may vary greatly without impairing the efficacy of the process. Slurries ranging from approximately $39 \times 10^8$ bacteria per milliliter to slurries containing approximately $39 \times 10^4$ bacteria per milliliter have been used.

*Example B.—Vacuum impregnation step.—*Scarified alfalfa seeds were immersed in a slurry of rhizobia produced as described in Example A. The mixture of the seeds and the bacterial slurry was placed in a suitable container and a vacuum equivalent to about 1.1 inches of mercury was drawn thereon. The vacuum was then released and the seeds removed from the slurry. The total time of contact of the seeds with the slurry was approximately 10 minutes, which was insufficient to cause any soaking of the seeds and swelling thereof. After removal of the seeds from the slurry, the seeds were permitted to air dry.

Seeds inoculated in accordance with the process described in Example B were thoroughly washed with a bactericidal aqueous solution of about 0.5 percent sodium hypochlorite by weight. This was done for the purpose of killing any bacteria which may have existed on the surface of the seeds. Surface-sterilized seeds were planted immediately after inoculation and after periods of storage. The seeds which were stored and then planted were surface sterilized a second time immediately before planting.

These surface-sterilized inoculated seeds were planted in a nitrogen-deficient growing medium. The nitrogen-deficient growing medium consisted of an aqueous mixture of suitable plant nutrients solidified by the addition of agar. The aqueous mixture of plant nutrients consisted of 0.5 cc. of 1 molar KCl; 0.2 cc. of 0.1 molar $MgSO_4 \cdot 7H_2O$; 0.2 cc. of 0.25 molar $Ca(H_2PO_4)_2 \cdot H_2O$; 8.0 cc. of 0.5 molar $CaSO_4$; 0.05 cc. of 0.5 percent Fe in the form of a chelate of ethylenediamine tetraacetic acid; 0.05 cc. of a solution of trace elements; and 91 cc. of deionized water. Approximately 1.5 grams of agar were added to this aqueous mixture and autoclaved. The pH of the autoclaved growing medium was then adjusted to about a pH of 8 by the addition of sodium hydroxide. The surface-sterilized, inoculated seeds were then placed aseptically on the agar surface after solidification. The roots of the plants growing from the seeds were inspected for the formation of nodules. The presence of nodules is evidence of the presence of viable rhizobia in the inoculated seed. The data of Table I illustrate the viability of the bacteria in the inoculated seeds.

*Table I*

| Length of Storage | ½ month | 1½ months | 3½ months | 4½ months |
| --- | --- | --- | --- | --- |
| Nodulations | Yes | Yes | Yes | Yes. |

Thus, even when grown under most stringent conditions, the seeds produced plants which had nodules formed on the roots. Moreover, no special conditions of storage were maintained for the seeds. The seeds were stored in closed containers at ordinary room temperature and humidity.

For purpose of comparison, the data of Table II are presented to show that the bacteria did not remain viable on seeds which have been merely immersed in the bacterial slurry. Alfalfa seeds were immersed in a bacterial slurry prepared in the manner described in Example A. The seeds were kept in the slurry at atmospheric pressure for about 10 minutes, which was also the maximum amount of time the seeds of Table I were kept in contact with the slurry. These immersed seeds were permitted to air dry, but were not surface sterilized. The same planting procedure was followed as described above.

*Table II*

| Length of storage | none | 1 month | 3 months |
| --- | --- | --- | --- |
| Nodulation | Yes | No | No. |

The following table illustrates the beneficial effect of the addition of a surface-tension depressant to the bacterial slurry and also that the concentration of the bacteria is not critical. The surface-tension depressant in this case was polyoxyethylene sorbitan monolaurate. Only very minor amounts of the surface-tension depressant need be used. In the instance of the examples of Table III, the depressant was present in an amount of 0.1 percent by weight of the slurry. The concentration in this case represents the level at which surface tension is reduced to the lowest level possible with the polyoxyethylene sorbitan monolaurate. Aside from the addition of the surface-tension depressant, the bacterial slurry was prepared in the manner described in Example A and is identified in Table III as the "concentrated" slurry (containing about $39 \times 10^8$ bacteria per milliliter). Alfalfa seeds were inoculated with the concentrated slurry in accordance with the procedure described in Example B, and additional batches of alfalfa seeds were inoculated in the same manner with the decimal dilutions of the concentrate specified in Table III. These seeds were also surface sterilized and planted in the manner described above. Two control groups of alfalfa seeds were also planted.

Table III

| Slurry Dilution (Depressant 0.1%) | No. of Plants per Container | No. of Nodulated Plants |
| --- | --- | --- |
| Concentrated | 5 | 4 |
| 1:10 | 5 | 4 |
| 1:100 | 5 | 4 |
| 1:1000 | 5 | 4 |
| 1:10,000 | 4 | 3 |
| Control (dipped into concentrate) | 3 | 1 |
| Control (not treated) | 4 | 0 |

Thus, it has been shown that discrete units of matter may be incorporated beneath the surface of seed, without destroying or deleteriously rupturing the seed coat. This has been specifically illustrated with bacteria; furthermore, it has been illustrated that the bacteria are able to persist in the seed for substantially long lengths of time. Other viable microorganisms, such as beneficial fungi, may also be incorporated in the seed in the same manner. Similarly, relatively insoluble insecticides, fungicides, bactericides, etc., may be incorporated into the seed in the form of finely divided, particulate matter. It is to be understood that various modifications will occur to those skilled in the art and that such modifications are encompassed within the following claims.

What is claimed is:

1. In a process for impregnating seeds with finely divided particulate matter, the combination of steps consisting of: contacting seeds under atmospheric pressure with a liquid slurry of finely divided, particulate matter; reducing the pressure thereon to below atmospheric pressure, with the seeds in contact with said slurry; and releasing the vacuum thus created, with the seeds in contact with said slurry.

2. In a process for impregnating seeds with finely divided particulate matter, the combination of steps consisting of: immersing seeds under atmospheric pressure in a liquid slurry of finely divided, particulate matter; reducing the pressure to below atmospheric pressure on said slurry with the seeds immersed therein; releasing the vacuum thus created, with the seeds in contact with said slurry; removing the seeds from said slurry; and drying the seeds.

3. In a process for impregnating seeds with finely divided particulate matter, the combination of steps consisting of: immersing seeds under atmospheric pressure in a liquid slurry of finely divided, particulate matter; reducing the pressure to below atmospheric pressure on said slurry with the seeds submerged therein; releasing the vacuum thus created, with the seeds in contact with said slurry; removing the seeds from said slurry, the total time of contact of the seeds with the slurry being insufficient to cause swelling of the seeds; and drying the seeds.

4. In a process for impregnating seeds with finely divided particulate matter, the combination of steps consisting of: spraying seeds with a liquid slurry of finely divided, particulate matter; reducing the pressure to below atmospheric pressure on said seeds sprayed with the slurry; and releasing the vacuum thus created.

5. In a process for impregnating seeds with finely divided particulate matter, the combination of steps consisting of: contacting seeds under atmospheric pressure with a liquid slurry of finely divided, particulate matter, said slurry containing a minor amount of a surface-tension depressant; reducing the pressure thereon to below atmospheric pressure, with the seeds in contact with said slurry; and releasing the vacuum thus created, with the seeds in contact with said slurry.

6. The process of inoculating seeds with bacteria comprising: contacting seeds under atmospheric pressure with a liquid slurry of bacteria; reducing the pressure thereon to below atmospheric pressure, with the seeds in contact with said slurry; and releasing the vacuum thus created, with the seeds in contact with said slurry.

7. The process of inoculating seeds with bacteria comprising: immersing seeds under atmospheric pressure in a liquid slurry of bacteria; reducing the pressure to below atmospheric pressure on said slurry with the seeds immersed therein; releasing the vacuum thus created, with the seeds in contact with said slurry; removing the seeds from said slurry; and drying the seeds.

8. The process of inoculating seeds with bacteria comprising: immersing seeds under atmospheric pressure in a liquid slurry of bacteria; reducing the pressure to below atmospheric pressure on said slurry with the seeds immersed therein; releasing the vacuum thus created, with the seeds in contact with said slurry; removing the seeds from said slurry, the total time of contact of the seeds with the slurry being insufficient to cause swelling of the seeds; and drying the seeds.

9. The process of inoculating seeds with bacteria comprising: spraying the seeds with a liquid slurry of bacteria; reducing the pressure to below atmospheric pressure on the seeds sprayed with the slurry, and then releasing the vacuum thus created.

10. The process of inoculating seeds with bacteria comprising: contacting seeds under atmospheric pressure with a liquid slurry of bacteria containing a minor amount of a surface-tension depressant; reducing the pressure thereon to below atmospheric pressure, with the seeds in contact with said slurry; and releasing the vacuum thus created.

11. The process of inoculating seeds with bacteria comprising: contacting seeds under atmospheric pressure with a liquid slurry of bacteria, said slurry containing bacterial gum and metabolic products produced during bacterial growth in a bacterial culture; reducing the pressure thereon to below atmospheric pressure, with the seeds in contact with said slurry; and releasing the vacuum thus created.

12. The process of inoculating seeds with bacteria comprising: immersing seeds under atmospheric pressure in a liquid slurry of bacteria containing a minor amount of a surface-tension depressant; reducing the pressure to below atmospheric pressure on said slurry with the seeds immersed therein; releasing the vacuum thus created, with the seeds in contact with said slurry; removing the seeds from said slurry; and drying the seeds.

13. The process of inoculating seeds with bacteria comprising: immersing seeds under atmospheric pressure in a liquid slurry of bacteria, said slurry containing bacterial gum and the metabolic products produced during bacterial growth in a bacterial culture; reducing the pressure to below atmospheric pressure on said slurry; releasing the vacuum thus created, with the seeds in contact with said slurry; and removing the seeds from said slurry.

14. The process of inoculating seeds with bacteria comprising: immersing seeds under atmospheric pressure in a liquid slurry of bacteria containing a minor amount of a surface-tension depressant; then reducing the pressure to below atmospheric pressure on said slurry; releasing the vacuum thus created, with the seeds in contact with said slurry; removing the seeds from said slurry, the total time of contact of the seeds with the slurry being insufficient to cause swelling of the seeds; and drying the seeds.

15. The process of inoculating seeds with bacteria comprising: immersing seeds under atmospheric pressure in a liquid slurry of bacteria, said slurry containing bacterial gum and metabolic products produced during the growth of the bacteria in a bacterial culture; reducing the pressure to below atmospheric pressure on said slurry; releasing the vacuum thus created, with the seeds in contact with said slurry; removing the seeds from said slurry, the total time of contact of the seeds with the slurry being insufficient to cause swelling of the seeds; and drying the seeds.

16. The process of inoculating seeds with bacteria comprising: spraying the seeds with a liquid slurry of bacteria containing a minor amount of a surface-tension depressant; then reducing the pressure to below atmospheric pressure on the seeds sprayed with the slurry; and releasing the vacuum thus created.

17. The process of inoculating seeds with bacteria comprising: spraying the seeds with a liquid slurry of bacteria, said slurry containing the bacterial gum and metabolic products produced during the growth of the bacteria in a bacterial culture; then reducing the pressure to below atmospheric pressure on the seeds sprayed with the slurry; and releasing the vacuum thus created.

18. The process of inoculating seeds comprising: contacting seeds under atmospheric pressure with a liquid slurry of viable microorganisms; reducing the pressure thereon to below atmospheric pressure, with the seeds in contact with said slurry; and releasing the vacuum thus created, with the seeds in contact with said slurry.

19. The process of inoculating seeds comprising: contacting seeds under atmospheric pressure with a liquid slurry of viable microorganisms, said slurry containing a minor amount of a surface-tension depressant; reducing the pressure thereon to below atmospheric pressure, with the seeds in contact with said slurry; and releasing the vacuum thus created.

References Cited in the file of this patent

UNITED STATES PATENTS

| | | |
|---|---|---|
| 570,813 | Nobbe | Nov. 3, 1896 |
| 674,765 | Hartleb | May 21, 1901 |
| 679,601 | Caron | July 30, 1901 |
| 1,604,778 | Klages | Oct. 26, 1926 |
| 1,893,248 | Sander | Jan. 3, 1933 |
| 2,101,584 | Horner | Dec. 7, 1937 |
| 2,206,851 | Potts | July 2, 1940 |
| 2,656,649 | Ostier | Oct. 27, 1953 |

FOREIGN PATENTS

| | | |
|---|---|---|
| 62,875 | Denmark | Nov. 6, 1944 |
| 874,656 | France | May 18, 1942 |
| 922,132 | France | Jan. 27, 1947 |
| 943,858 | Germany | June 1, 1956 |
| 3,688 | Great Britain | of 1904 |
| 743,350 | Great Britain | Jan. 11, 1956 |
| 82,041 | Sweden | Nov. 20, 1934 |
| 227,306 | Switzerland | Sept. 1, 1943 |

OTHER REFERENCES

Publications:
Hackh's Chemical Dictionary, third edition, published by Blakiston (Phila.), 1944. Page 886 relied on.

Concise Chemical and Technical Dictionary (Bennett), published by Chemical Pub. Co. (N.Y.), 1947. Page 24 relied on.